US009979237B2

(12) United States Patent  (10) Patent No.: US 9,979,237 B2
Nalbant  (45) Date of Patent:  May 22, 2018

(54) ADAPTIVE RESONANT TOPOLOGY APPLICATION IN WEARABLE DEVICES

(71) Applicant: INTEGRATED DEVICE TECHNOLOGY, INC., San Jose, CA (US)

(72) Inventor: Mehmet K. Nalbant, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 125 days.

(21) Appl. No.: 15/067,025

(22) Filed: Mar. 10, 2016

(65) Prior Publication Data

US 2016/0268848 A1   Sep. 15, 2016

Related U.S. Application Data

(60) Provisional application No. 62/131,800, filed on Mar. 11, 2015.

(51) Int. Cl.
    H02J 50/12    (2016.01)
    H02J 7/02     (2016.01)
(52) U.S. Cl.
    CPC .............. *H02J 50/12* (2016.02); *H02J 7/025* (2013.01)
(58) Field of Classification Search
    CPC .................................. H02J 50/12; H02J 7/025
    USPC ........................................................ 307/104
    See application file for complete search history.

(56) References Cited

U.S. PATENT DOCUMENTS

| 8,664,942 | B2 * | 3/2014 | May .......................... F16F 9/04 |
| | | | 324/207.15 |
| 8,729,736 | B2 | 5/2014 | Urano |
| 9,078,743 | B2 * | 7/2015 | Tai ........................ A61N 1/0543 |
| 2004/0130915 | A1 | 7/2004 | Baarman |
| 2010/0201312 | A1 | 8/2010 | Kirby et al. |
| 2013/0043734 | A1 | 2/2013 | Stone et al. |
| 2013/0214890 | A1 | 8/2013 | Zabaco |
| 2013/0278076 | A1 | 10/2013 | Proud |
| 2013/0307346 | A1 * | 11/2013 | Arisawa .................. H01F 38/14 |
| | | | 307/104 |
| 2014/0132077 | A1 | 5/2014 | Nalbant |

FOREIGN PATENT DOCUMENTS

WO      2014042681 A2    3/2014

OTHER PUBLICATIONS

International Search Report, International Application No. PCT/US2016/021877, dated May 23, 2016, 2 pages.
Written Opinion of the International Searching Authority, International Application No. PCT/US2016/021877, dated May 23, 2016, 4 pages.

* cited by examiner

*Primary Examiner* — Dinh T Le
(74) *Attorney, Agent, or Firm* — Haynes and Boone, LLP

(57) ABSTRACT

A wireless power transmission system is presented. The wireless power circuit includes an adaptive transmitter coupled to a transmit coil; a receive coil in interaction with the transmit coil, the receive coil being thin and having an inner diameter large enough to accommodate sensors of a wearable device; and a receive circuit receiving power from the receive coil.

7 Claims, 5 Drawing Sheets

ADAPTIVE RESONANT TOPOLOGY APPLICATION IN WEARABLE DEVICES

RELATED APPLICATION

The present application claims priority to U.S. Provisional Patent Application 62/131,800, entitled "Adaptive Resonant Topology Application in Wearable Devices," by Mehmet K. Nalbant, filed on Mar. 11, 2015, which is herein incorporated by reference its entirety.

BACKGROUND

Technical Field

Embodiments of the present invention are related to adaptive resonant wireless charging in wearable devices.

Discussion of Related Art

Wearable devices, for example smart watches, have sensor technology that may be present in the center of any wireless receive coils that may be present. The complication of the sensor locations and the low efficiencies of wireless charging have made wireless charging technologies unattractive for wearable devices.

Therefore, there is a need to develop better wireless charging technologies for wearable devices.

SUMMARY

In accordance with aspects of the presents a wireless power transmission system. The wireless power circuit includes an adaptive transmitter coupled to a transmit coil; a receive coil in interaction with the transmit coil, the receive coil being thin and having an inner diameter large enough to accommodate sensors of a wearable device; and a receive circuit receiving power from the receive coil.

A wireless power transmitter according to some embodiments of the present invention can include an adaptively controlled transmitter; and a transmit coil coupled to the adaptively controlled transmitter, the transmit coil being adapted to couple with a thin receiver coil with a large inner diameter to accommodate sensors.

A wireless power receiver according to some embodiments of the present invention includes a receive coil, the receive coil being thin and having an inner diameter large enough to accommodate sensors; and a circuit coupled to the receive coil to receive power at a frequency adaptively chosen by an adaptive transmitter.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Some embodiments of the present invention present a high efficiency Adaptive Resonant (AR) topology application with receiver (RX) and transmitter (TX) coils specifically designed for smart watch applications where a number of sensors have to go through or be present at the center area of the RX coil. Smart watches and similar wearable devices often have sensors present in the center of the wireless RX coils. In addition to the sensor difficulty, current wireless power implementations suffer from low efficiency. Applying an AR wireless topology with RX and TX coils with large inner diameter area removed of magnetic shield material allows these sensors to 'go through' while at the same time providing high efficiency power transfer.

AR topology already allows for high efficiency wireless power transfer. Utilizing this topology with RX/TX Coils that have large center sections of their magnetic shield removed has the effect of redirecting the magnetic flux away from metal areas present in the sensors, thus preventing eddy current losses. This results in high efficiency operation.

Previous efforts have utilized WPC qi like circuits and coils design. The best performance obtained thus far is about 50% efficiency.

Figure 1:
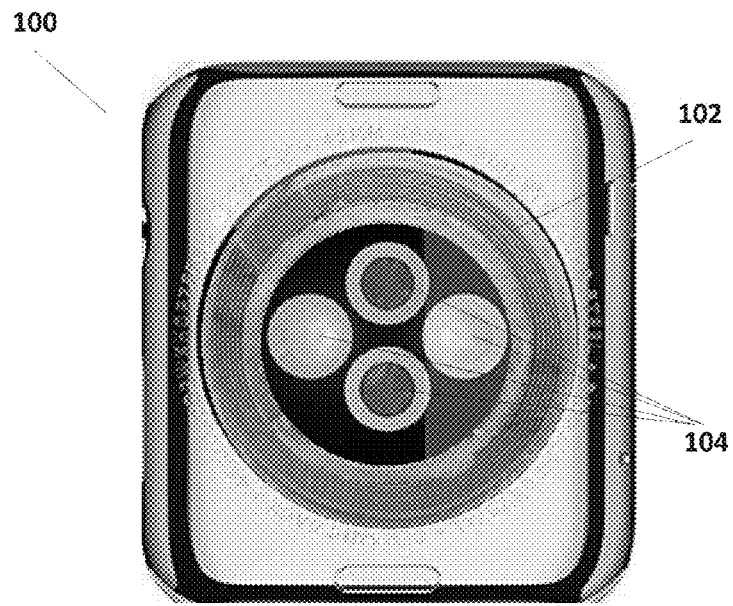
FIG. 1 illustrates a wearable device with a receive coil.
Figure 2:
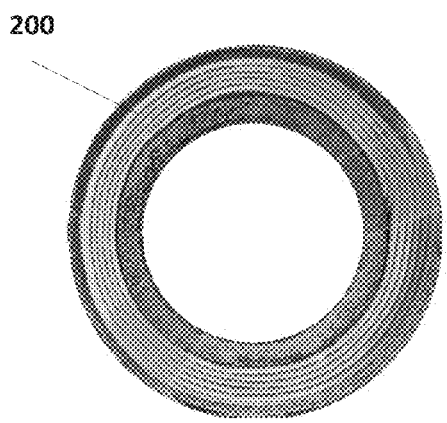
FIG. 2 illustrates a transmit coil that can be used with the receive coil illustrated in FIG. 1.

FIG. 1 illustrates a wearable device 100. As shown in the example of FIG. 1, wearable device 100 includes a RX coil 102 and sensors 104 located in the center of RX coil 102. Sensors 104 can be any sensors that are used by wearable device 100. FIG. 2 illustrates a TX coil 200 that can be used to supply power to RX coil 102. In embodiments of the present invention, TX coil 200 is driven with an adaptive resonant driver that optimizes power transfer between TX coil 200 and RX coil 102.

RX coil 102 and TX coil 200 are specifically adapted to wearable device 100. RX coil 102 can absent of magnetic shielding material at its center and is of large enough diameter to accommodate sensors 104. Additionally, RX coil 102 may be relatively thin (e.g., thinner than sensors 104) so as to not interfere with sensors 104, some of which may be contact a user directly when device 100 is worn.

Figure 3A:
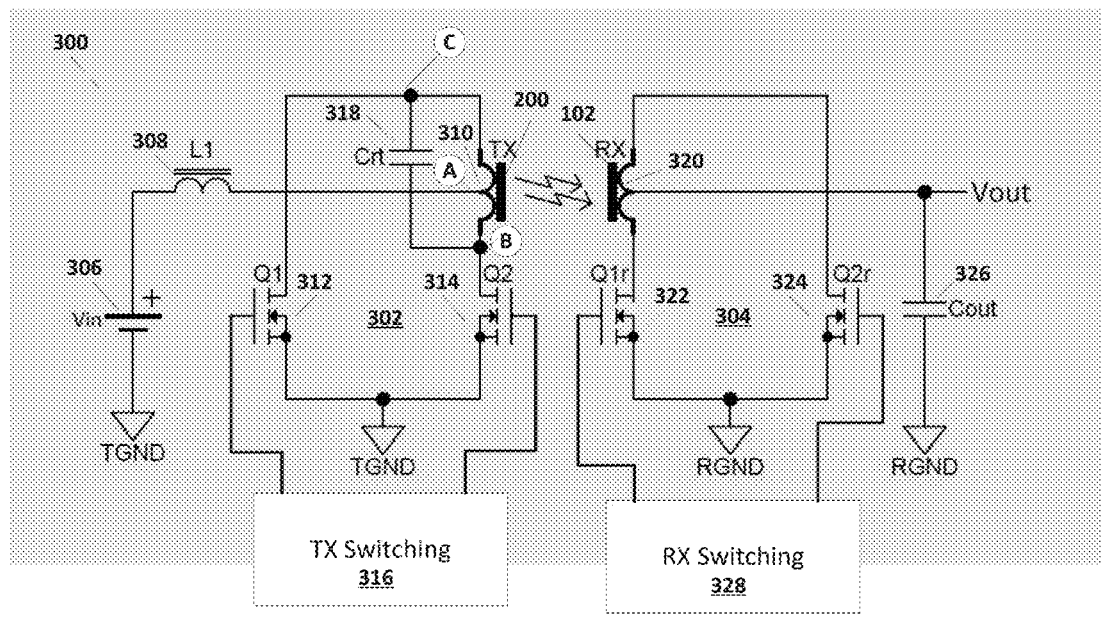
FIGS. 3A and 3B illustrate in more detail an example of a transmitter and receiver pair according to some embodiments of the present invention.
Figure 3B:
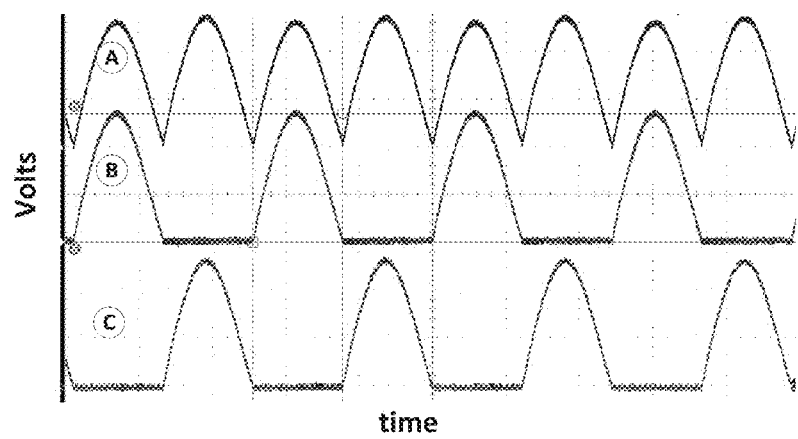

FIGS. 3A and 3B illustrate in more detail a system 300 with an example transmit circuit 302 an example receive circuit 304 according to some embodiments. As shown in FIG. 3A, transmitter 302 receives an input voltage Vin from power source 306, which is coupled through an inductor 308 (L1) to a center tap 310 of TX coil 200. In some embodiments, transmit coil 200 may not include a center tap 310 and other configurations may be derived for transmitter 302. A capacitor 318 (Crt) is connected across TX coil 200 and FETs 312 (Q1) and 314 (Q2) are coupled between each side of TX coil 200 and ground. The gates of FETs 312 and 314 are coupled to TX switching 316, which alternates grounding of each side of TX coil 200 in order to activate TX coil 200.

FIG. 3B illustrates voltage vs. time curves at points A, B, and C in the transmitter circuit 302. Point A is the voltage at the center tap 310 of TX coil 200, which as shown alternates between 0 and Vin. Point B is the Drain of transistor 314 (Q2) and point C is the drain of transistor 312 (Q1). As is illustrated, transistors 312 and 314 are turned on (the drain is then ground) by TX switching 316 as the voltage at the drain of that transistor decreases to 0 and is turned off when the drain of the other transistor decreases to 0. Consequently, the frequency at which TX switching 316 switches transistors 312 (Q1) and 314 (Q2) is determined by the dynamics of the transmit/receive circuit itself. This arrangement further provides for an operating frequency that maximizes the power transferred between the TX coil 200 and RX coil 102. Such an arrangement is referred to herein as an adaptive transmit arrangement.

The receive circuit illustrated in FIG. 3A receives power through RX coil 102 in a similar fashion. Transistors 322 (Q1r) and 324 (Q2r), which rectify the power signal received by RX coil 102, are switched by RX switching 328 similarly as that described above with respect to TX switching 316 for transmit transistors 312 (Q1) and 314 (Q2). Consequently, transistors 322 (Q1r) and 314 (Q2r) are switched at a frequency that matches the switching frequency of transistors 312 (Q1) and 314 (Q2).

Transistors 322 (Q1r) and 324 (Q2r) allow for a half-duplex rectification of the signal Vout taken from center tap 320 of coil 102. Capacitor 326 (Cout) filters the signal Vout to a DC voltage.

Figure 4:
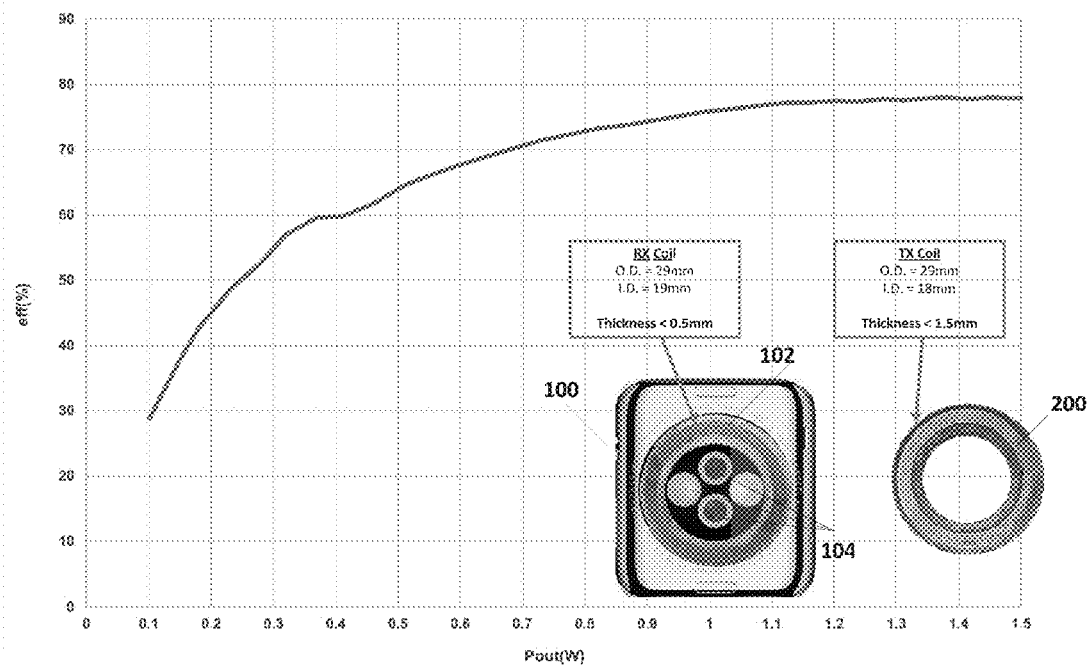
FIG. 4 illustrates the efficiency versus output power relationship for a transmit coil/receive coil combination according to some embodiments of the present invention.

As a particular example of a system 300, RX coil 102 can have an outer diameter of 29 mm, an inner diameter of 19 mm, and a thickness of less than 0.5 mm. Correspondingly, TX coil 200 can have an OD of 29 mm, an ID of 18 mm, and a thickness of less than 1.5 mm. Using these dimensions, the efficiency of power transfer between TX coil 200 and RX coil 120, operating as described with respect to system 300 of FIG. 3A, is illustrated in FIG. 4. As is illustrated in FIG. 4, the efficiency at power levels above about 1 W of transmit power is greater than 75%.

Figure 5:
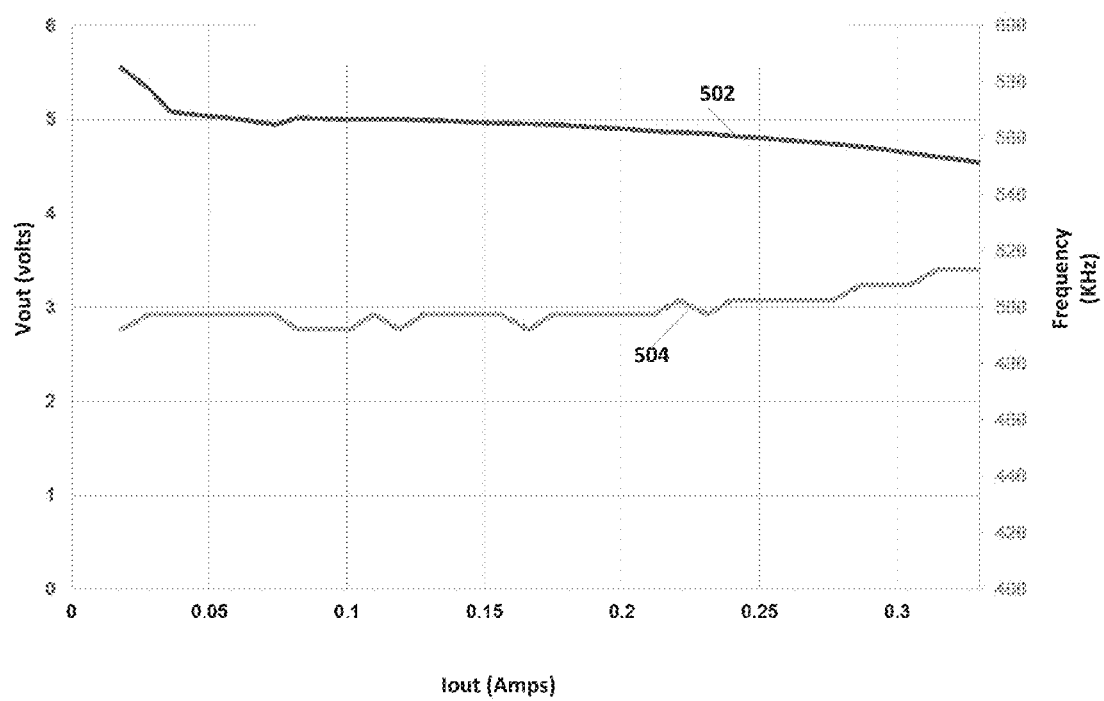
FIG. 5 illustrates the voltage and frequency versus output current for a transmit coil/receive coil combination according to some embodiments of the present invention.

FIG. 5 illustrates the output voltage Vout of a receiver and frequency as a function of output current for the TX/RX pair described above. In the illustration of FIG. 4, Vin is 5.0 V. Curve 502 illustrates the output voltage Vout as a function of output current Iout while curve 504 illustrates the operating frequency as a function of output current Iout.

Figure 6:
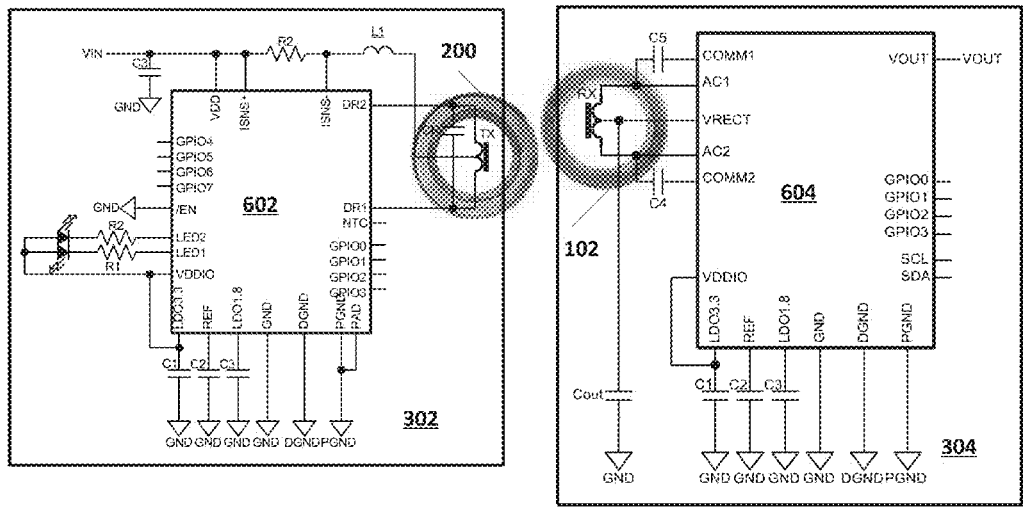
FIG. 6 illustrates a schematic drawing of a transmitter and receiver according to some embodiments of the present invention.

FIG. 6 illustrates a TX/RX schematic illustrating the adaptive transmitter and receiver pair of system 300 as illustrated in FIG. 3A, according to some embodiments of the present invention. As is shown in FIG. 5, transmitter circuit 302 includes TX coil 200 is driven by IC 502. IC 502 receives an input voltage Vin and provides switching at a frequency that minimizes the impedance of the interacting TX coil 200 and RX coil 102 pair, thus maximizing the power transferred between TX coil 200 and RX coil 102. Receiver circuit 304 includes IC 504 that matches the switching frequency provided by IC 502 in order to efficiently receive the power from RX coil 102 and provide an output voltage Vout that can be used by wearable device 100.

The above detailed description is provided to illustrate specific embodiments of the present invention and is not intended to be limiting. Numerous variations and modifications within the scope of the present invention are possible. The present invention is set forth in the following claims.

What is claimed is:

1. A device, comprising:
a receive coil for receiving power from a transmit coil, the receive coil having an inner diameter, an outer diameter, and a thickness;
one or more sensors located within the inner diameter of the receive coil;
a first transistor coupled between a first side of the receive coil and ground;
a second transistor coupled between a second side of the receive coil and ground; and
a receive switching circuit coupled to gates of the first transistor and the second transistor, the receive switching circuit adaptively switching the first transistor and the second transistor such that the receive coil operates at a resonant frequency of the transmit coil.

2. The device of claim 1, wherein the one or more sensors are thicker than the thickness of the receive coil.

3. The device of claim 1, wherein the device is wearable.

4. A wireless power transmitter, comprising:
a transmit coil adapted to couple with a receiver coil
a power source coupled through an inductor to a center tap of the transmit coil;
a capacitor coupled across the transmit coil;
a first transistor coupled between a first side of the transmit coil and ground;
a second transistor coupled between a second side of the transmit coil and ground; and
a transmit switching circuit coupled to gates of the first transistor and the second transistor, the transmit switching circuit adaptively switching the first transistor and the second transistor such that the transmit coil operates at a resonant frequency.

5. A wireless power receiver, comprising:
a receive coil configured, to receive power at a frequency adaptively chosen by an adaptive transmitter;
a first transistor coupled between a first side of the receive coil and ground;
a second transistor coupled between a second side of the receive coil and ground; and
a receive switching circuit coupled to gates of the first transistor and the second transistor, the receive switching circuit adaptively switching the first transistor and the second transistor such that the receiver operates at a resonant frequency of the adaptive transmitter.

6. The wireless power receiver of claim 5, wherein:
the receive coil has an inner diameter, an outer diameter, and a thickness; and
the wireless power receiver is configured to power one or more sensors located within the inner diameter of the receive coil.

7. The wireless power receiver of claim 6, wherein the one or more sensors are thicker than the thickness of the receive coil.

* * * * *